Nov. 14, 1939.　　　S. LEIBOW　　　2,179,939
BROILER UTENSIL
Filed Feb. 15, 1938
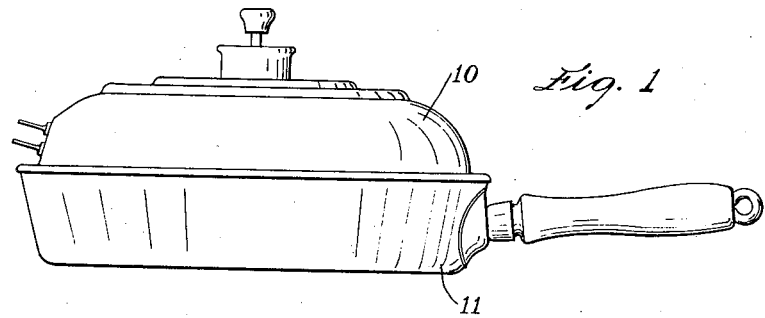
Fig. 1
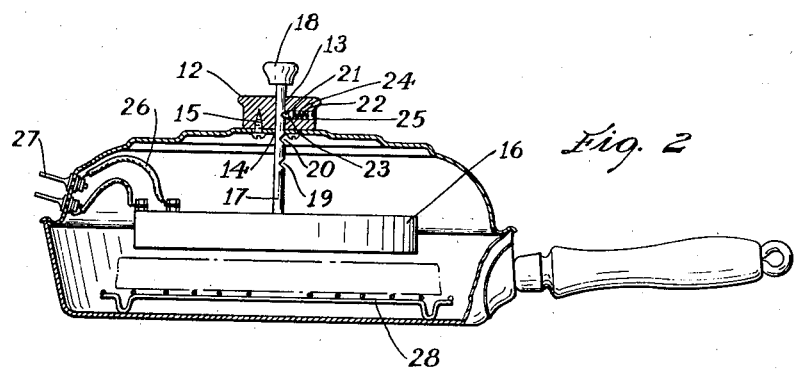
Fig. 2
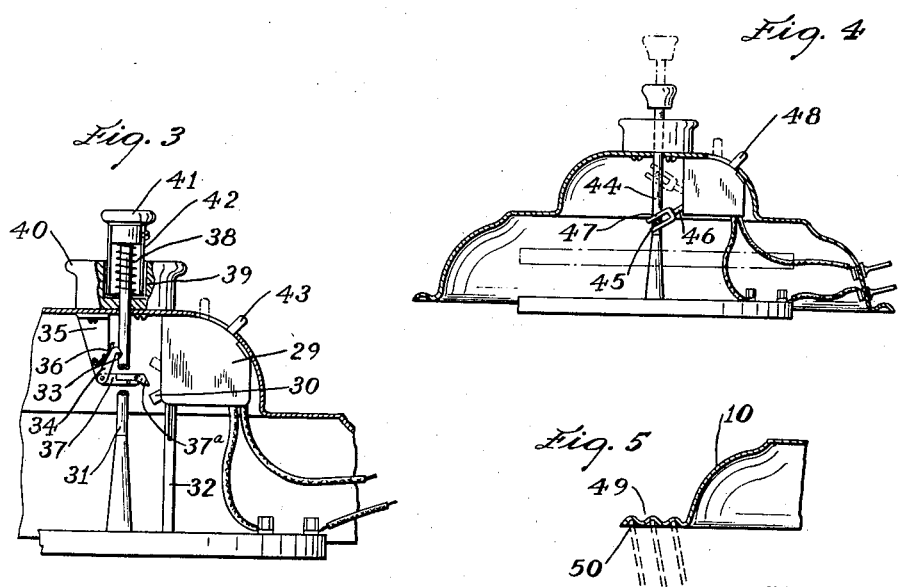
Fig. 3
Fig. 4
Fig. 5
INVENTOR
Saul Leibow
BY Nathaniel Frucht
ATTORNEY Patented Nov. 14, 1939

2,179,939

UNITED STATES PATENT OFFICE 2,179,939

BROILER UTENSIL

Saul Leibow, Providence, R. I., assignor of forty per cent to Ira Riffkin, Providence, R. I.

Application February 15, 1938, Serial No. 190,592

3 Claims. (Cl. 219—19)

My present invention relates to electrical cooking utensils, and more specifically to an electric broiler.

The principal object of my invention is to provide an adjustable broiler cover which cooperates with a conventional frying pan to permit rapid broiling.

Another object of my invention is to provide a broiler mechanism which is adjustable to permit initial searing and subsequent controlled broiling temperature.

A further object of my invention is to provide a broiler mechanism which is automatic in its operation and which requires no attention after it is placed in operation.

Another object of my invention is to provide a mechanism of this type which is economical to manufacture and assemble and which is simple to operate.

With the above and other objects and advantageous features in view, my invention consists of a novel arrangement of parts more fully disclosed in the detailed description following, in conjunction with the accompanying drawing, and more specifically defined in the claims appended thereto.

In the drawing:

Fig. 1 is a side elevation of a cover carrying a broiler element and positioned over a conventional frying pan;

Fig. 2 is a vertical section of the same;

Fig. 3 is an enlarged detail, partly in section, showing one type of automatic operating mechanism;

Fig. 4 is a similar view of another type of automatic operating mechanism; and

Fig. 5 is a fragmentary sectional view of a modified form of cover.

Referring more in detail to the drawing, the numeral 10 generally designates a cover adapted to fit over a conventional frying pan 11, the cover 10 being preferably concave and of sufficient curvature and depth to house the hereinafter described mechanism. The cover 10 is provided with a knob or handle 12, the handle having a central bore 13 communicating with a hole 14 through the upper portion of the cover 10 and being fixed to the cover by any suitable means such as a wood screw 15. A conventional electric heating element 16 is mounted in the concave portion of the cover 10 by means of a rod 17 fixed to the upper central part of the heating element and vertically slidable in the bore 13 and through the hole 14 in the cover 10. The rod 17 extends above the handle 12 and carries a manually graspable knob 18, and is provided with suitable spaced notches 19, 20 and 21. The handle 12 is provided with a horizontal bore 22 communicating with the vertical bore 13. Slidably mounted in the bore 22 is a pointed pin 23 urged into the bore 22 and into the bore 13 by a coil spring 24. The spring 24 is held in place and adjustably urged against the pin 23 by an adjustment screw 25 threadedly engaging the bore 22. The pin 23 is adapted to selectively engage the notches 19, 20 and 21 to position the heating element at selected distances above the pan. The conventional heating element 16 is disposed with the heating surface or coils facing downwardly and has suitable electrical cord connections 26 attached thereto which lead to an insulated conventional contact plug receiving element 27 extending laterally through the cover 10.

A grate or grid 28 of conventional design may be placed in the bottom of the pan 11 to hold the meat or other food to be broiled.

In operation, a piece of steak or other suitable meat is placed upon the grid 28 and the cover 10 is placed over the pan, the element 27 being connected to the house power line by means of the usual cord connection. Downward pressure on the knob 18 forces the heating element downwardly in close proximity to the steak, the spring pressed pin 23 engaging the groove 21 to hold the heating element in place adjacent the meat. This close contact sears the steak which can be then turned over and the searing action repeated on the other side. When the steak has been properly seared, the rod 17 may be pulled upwardly manually so that the remaining broiling can be completed without burning the meat, the heating element being selectively pulled upwardly so that the pin will releasably snap into grooves 19 and 20, depending on whether a medium or well-done steak is desired.

For one type of automatic operation, (Fig. 3), I provide a conventional clock mechanism 29 such as used in a standard type electric toaster. The clock mechanism 29 is fixed to the underside of the cover 10 with its tripping member 30 adjacent the rod 31 holding the heating element and its speed adjustment lever 43 extending through the cover, and a slotted rod 32 connects the heating element with the clock winding mechanism so that downward movement of the heating element automatically winds the clock. In this form the rod 31 is provided with a notch 33, and a pawl 34 is provided on a support 35 riveted to the underside of the cover so that it engages the notch 33 to limit upward movement of the rod 31. A spring member 36 is riveted to the support 35 in position to yieldingly push the pawl 34 into engagement. The pawl 34 is provided with a tripping arm 37 having a pawl arm 37a extending into the path of the tripping member 30 of the clock mechanism, and a coil spring 38 is placed around the upwardly extending portion of the rod 31 with the lower end extending into a recess 39 in the handle 40 and the upper end abutting the knob 41. The spring may be suitably housed in a hollow cylinder 42.

As the knob 41 is pushed downwardly against the tension of the spring 38, the heating element is pushed in proximity to the steak, as in the first described arrangement. The spring element 36 pushes the pawl 34 into engagement with the notch 33, preferably on upward movement of the heating element. The pawl arm 37a permits downward movement of the tripping arm 30. The downward movement of the heating element has wound the clock mechanism by means of the rod 32. At the end of a predetermined time sufficient to sear the steak, the clock mechanism will trip and the tripping member 30 will kick the pawl arm 37 and will release the pawl 34 from engagement with the notch 33. The spring 38 will then lift the heating element away from the steak, and the broiling is then completed.

The heretofore described arrangement can be made further automatic by providing for a shutting off of the electric current by means of the clock mechanism or by means of the upward movement of the heating element in a conventional manner. The clock mechanism can similarly be adjusted to release the heating element from searing position to broiling position and then to further release the heating element and shut off the current.

In the above described form the heating element is lifted in sudden movements. If a gradual lifting movement is desired, I provide the form shown in Fig. 4. The rod 44 which operates the heating element, is provided with a laterally extending pin 45. The clock tripping element 46 is forked at the end, as at 47, the forked end slidably engaging the pin 45. The tripping arm is caused to gradually lift the rod and attached heating element upwardly and then the clock mechanism shuts off the current. The adjustment lever 48, extending through the cover, may be used to control the speed of the clock mechanism, and the cover may be suitably graduated.

As shown in Fig. 5, the cover 10 may be provided with an annular rim 49 having annular ridges and grooves 50 to permit the use of a single cover for frying pans of different diameters.

While I have described specific constructional embodiments of my invention, any desired changes in the material used for the parts, in their relative arrangement and assembly and in their relative proportions may be made to suit the requirements for different broiler designs, without departing from the spirit and the scope of the invention as defined in the appended claims.

I claim:

1. In combination, a cover for a cooking utensil, a heater element mounted in said cover, and means for adjustably setting said heater element in said cover, said means including a rod secured to said heater element and extending upwardly through and slidably mounted in said cover, and cooperating elements associated with said cover and said rod for selectively releasably locking said rod at different points along the length thereof to said cover, said elements comprising spring-pressed pin and detent mechanism.

2. In combination, a cover for a cooking utensil, a heater element mounted in said cover, and means for adjustably setting said heater element in said cover, said means including a rod secured to said heater element and extending upwardly through and slidably mounted in said cover, and cooperating elements associated with said cover and said rod for selectively releasably locking said rod at different points along the length thereof to said cover, said elements comprising a spring-pressed pin mounted in said cover and longitudinally spaced detent grooves on said rod.

3. In combination, a cover for a cooking utensil, a heater element mounted in said cover, and means for adjustably setting said heater element in said cover, said means including a rod secured to said heater element and extending upwardly through and slidably mounted in said cover, spring means urging said rod upwardly through said cover, and releasable cooperating detent and pawl means on said rod and said cover for releasably retaining said rod in set position against the pressure of said spring means.

SAUL LEIBOW.